US012091901B2

(12) United States Patent
Muh et al.

(10) Patent No.: US 12,091,901 B2
(45) Date of Patent: Sep. 17, 2024

(54) DYNAMIC CHANGE IN TOUCH RESPONSE TIME OF DOOR HAND TOUCH SENSOR

(71) Applicant: Honda Motor Co., Ltd., Tokyo (JP)

(72) Inventors: Chyuan Yuen Muh, Powell, OH (US); Brian K. Lickfelt, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 327 days.

(21) Appl. No.: 17/866,077

(22) Filed: Jul. 15, 2022

(65) Prior Publication Data

US 2024/0018822 A1 Jan. 18, 2024

(51) Int. Cl.
*G07C 9/00* (2020.01)
*E05F 15/75* (2015.01)

(52) U.S. Cl.
CPC .......... *E05F 15/75* (2015.01); *G07C 9/00944* (2013.01); *G07C 2009/0096* (2013.01)

(58) Field of Classification Search
CPC ................ E05F 15/75; G07C 9/00944; G07C 2009/0096; G07C 2209/63; G07C 2209/65; G07C 9/00309; E05Y 2400/86; E05Y 2900/531
See application file for complete search history.

(56) References Cited

U.S. PATENT DOCUMENTS

| | | | |
|---|---|---|---|
| 7,154,376 B2 | 12/2006 | Yoshida et al. | |
| 7,283,034 B2 | 10/2007 | Nakamura et al. | |
| 10,118,594 B2 | 11/2018 | Lickfelt et al. | |
| 10,160,421 B2 | 12/2018 | Katou | |
| 10,202,102 B2 | 2/2019 | Hiramine | |
| 11,080,952 B2 * | 8/2021 | Kim | E05B 81/78 |
| 2007/0171057 A1 | 7/2007 | Ogino et al. | |

FOREIGN PATENT DOCUMENTS

| | | |
|---|---|---|
| DE | 102004052907 A1 | 5/2006 |
| DE | 102011080430 A1 | 9/2012 |
| JP | 2010077664 A | 4/2010 |
| JP | 4484855 B2 | 6/2010 |
| WO | 2013079310 A1 | 6/2013 |
| WO | 2019013948 A1 | 1/2019 |

* cited by examiner

*Primary Examiner* — Ian Jen
(74) *Attorney, Agent, or Firm* — Suzanne Gagnon; American Honda Motor Co., Inc.

(57) ABSTRACT

A sensor system and method for a dynamic change in a touch response time of a door hand touch sensor is provided. The sensor system receives a first communication associated with an actuation setting of the door via the in-vehicle communication bus. The actuation setting includes an option to trigger lock or unlock operations of the door based on a movement of a portable device towards or away from the vehicle. Thereafter, the sensor system controls the touch sensing unit to change a touch response time of the touch sensing unit from a first value to a second value. The change is performed based on the first communication.

20 Claims, 4 Drawing Sheets

DYNAMIC CHANGE IN TOUCH RESPONSE TIME OF DOOR HAND TOUCH SENSOR

BACKGROUND

Advancements in vehicle technology have led to development of various features that focus on enhancing a user experience with a vehicle. A smart door entry system is one such feature. In a smart entry system, a user may lock or unlock the door of the vehicle by simply touching capacitive touch sensor(s) on the door handle. During operation, the sensors may periodically draw a constant amount of quiescent current from a power source, such as a battery unit of the vehicle. In order to provide a fast reaction or response time, the sensors may draw a higher amount of quiescent current than a desired amount. Over a period of time (e.g., few hours or days), the higher current consumption may discharge the battery or may reduce the availability of power for other important functions of the vehicle. If the vehicle is an electric vehicle, then the vehicle may offer a lower mileage per charge due to the power consumption of the sensors in the door handle.

Limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a sensor system for dynamic change in a touch response time of a door handle touch sensor is provided. The sensor system may include a touch sensing unit and control circuitry that may be communicatively coupled to the touch sensing unit and an in-vehicle communication bus. The control circuitry may receive a first communication associated with an actuation setting of a door of a vehicle via the in-vehicle communication bus. The actuation setting may include an option to trigger lock or unlock operations of the door based on a movement of the portable device towards or away from the vehicle. The control circuitry may control the touch sensing unit to change a touch response time of the touch sensing unit from a first value to a second value. The change may be performed based on the first communication.

According to another embodiment of the disclosure, a method for dynamic change in touch response time of door hand touch sensor is provided. The method may include receiving a first communication associated with an actuation setting of a door of a vehicle via an in-vehicle communication bus. The actuation setting may include an option to trigger lock or unlock operations of the door based on a movement of the portable device towards or away from the vehicle. The method may further include controlling a touch sensing unit to change a touch response time of the touch sensing unit from a first value to a second value. The change may be performed based on the first communication.

According to another embodiment of the disclosure, a non-transitory computer-readable medium is provided. The non-transitory computer-readable medium may have stored thereon computer implemented instructions that, when executed by a sensor system, causes the system to execute operations. The operations may include receiving a first communication associated with an actuation setting of a door of a vehicle via an in-vehicle communication bus. The actuation setting may include an option to trigger lock or unlock operations of the door based on a movement of the portable device towards or away from the vehicle. The operations may further include controlling a touch sensing unit to change a touch response time of the touch sensing unit from a first value to a second value, wherein the change is performed based on the first communication.

Figure 1:
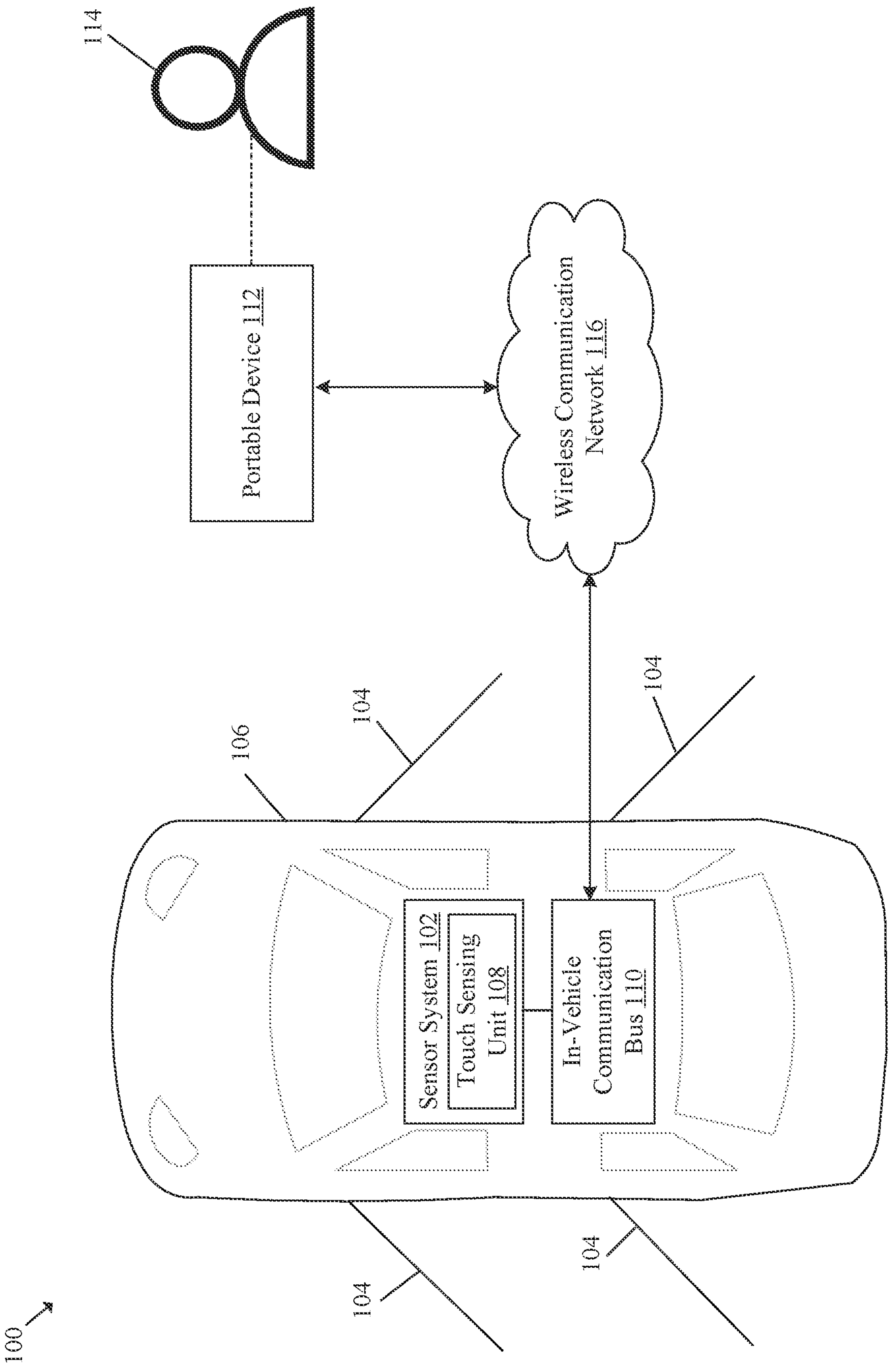
FIG. 1 is a block diagram that illustrates an exemplary network environment for dynamic change in touch response time of door hand touch sensor, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed sensor system for dynamic change in touch response time of door hand touch sensor. To enhance the user experience, a vehicle may include a keyless entry system (also called as a remote keyless system). In such a keyless entry systems, a user may lock or unlock the door simply by touching the door handles of the door without a need to physically insert the key in the door lock of the vehicle. Many components such as sensors, switches, actuators may work together to achieve the objectives of this keyless entry system. The door handles on the door of the vehicle may include capacitive touch sensors that are connected to a body controller (i.e., an Electronic control unit (ECU)) of the vehicle. When the user touches the door handle, touch sensors included in the door handle may trigger the body controller to execute lock or unlock operations causing the door to lock or unlock.

Typically, the touch response time of the touch sensor is fixed, and the touch sensor must operate at all the time-instants to collect measurements periodically regardless of the whether the door is required to be locked or unlocked. Therefore, the touch sensor typically draws a fixed amount of current from a supply unit (e.g., a battery) of the vehicle after every fixed interval of time. For a low touch response time (e.g., 1 millisecond), a relatively high amount of current (e.g., 1 milliamp) is periodically drawn from the supply unit (e.g., battery) of the vehicle. Over a long period of time (e.g., few hours or day(s)), the current or power consumption can discharge the battery by a certain percentage (e.g., 30% or more). In certain instances, the battery may be discharged significantly (e.g., 100). Therefore, there is a need to have a sensor system that minimizes the power consumption from the vehicle battery without disabling the touch sensors in respective door handles of the vehicle.

Exemplary aspects of the disclosure may provide a sensor system that may be able to dynamically change the power consumption based on one or more customization settings of the vehicle. The disclosed sensor system includes a touch sensing unit and control circuitry that may be communicatively coupled to the touch sensing unit and an in-vehicle communication bus. The control circuitry may receive a first communication associated with an actuation setting of the door of a vehicle. The actuation setting may include an option to trigger lock or unlock operations of the door, based a movement of the portable device towards or away from the vehicle. In case the option is selected, the door of the vehicle may be unlocked or locked based on the movement of the portable device towards or away from the vehicle. The control circuitry may further control a supply of electric power to the touch sensing unit based on the first communication to change a touch response time of the touch sensing unit from a first value (e.g., 1 milliseconds) to a second value (e.g., 50 milliseconds). The change may be performed based on the first communication. For dynamically changing the touch response time, the disclosed sensor system may vary a supply of electric current to the touch sensing unit. Over a period of time, the difference in consumption of the electric current may translate to power savings for the vehicle.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a block diagram that illustrates an exemplary network environment for dynamic change in touch response time of door hand touch sensor, in accordance with an embodiment of the disclosure. With reference to FIG. 1, there is shown a network environment diagram 100 which may include a sensor system 102 for a door 104 of a vehicle 106. In FIG. 1, there is shown a touch sensing unit 108, and an in-vehicle communication bus 110. There is further shown a portable device 112, a user 114 associated with the vehicle 106, and a wireless communication network 116.

The sensor system 102 may include suitable logic, circuitry, interfaces, and/or code that may be configured to receive communication(s) associated with an actuation setting of the door 104 of the vehicle 106 and control the touch sensing unit 108 to change a touch response time of the touch sensing unit 108. An example implementation of the sensor system 102 may be a touch sensor for a door handle or a vehicle component different from the door handle. Example of the vehicle component may include, but are not limited to, a vehicle trunk, a vehicle hood, a vehicle seat, a steering wheel, a lid disposed on a charging or fuel port, or any in-vehicle compartment with an electronically actuated cover.

The door 104 may be an assembly through which the user 114 associated with the vehicle 106 may enter the vehicle 106, exit the vehicle, or may open a compartment (e.g., a trunk space or a space beneath a hood) of the vehicle 106. The door 104 may be configured to engage with a body portion of the vehicle 106 via an electronically actuated door lock. Examples of the door 104 may include, but are not limited to, a scissor door, a gull-wing door, a butterfly door, a coach door, a sliding door, a pocket door, a swan door, a canopy door, a dihedral door, and a front hinged door.

The vehicle 106 may be a non-autonomous vehicle, a semi-autonomous vehicle, or a fully autonomous vehicle, for example, as defined by National Highway Traffic Safety Administration (NHTSA). Examples of the vehicle 106 may include, but are not limited to, a four-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. Examples of the four-wheeler vehicle may include, but are not limited to, an electric car, an internal combustion engine (ICE)-based car, a fuel-cell based car, a solar powered-car, or a hybrid car. The four-wheeler vehicle in FIG. 1 is merely shown as an example. The present disclosure may be also applicable to other types of vehicle, such as a three-wheeler vehicle, a six-wheeler vehicle, an n-wheeler vehicle (where n may be more than 2), a truck, a boat, or an aircraft. The description of other types of the vehicle 106 has been omitted from the disclosure for the sake of brevity.

The touch sensing unit 108 may be an electronic circuit that may be configured to disposed in a door handle of the door 104 of the vehicle 106. The touch sensing unit 108 may be disposed such that that the touch surface (not shown) is in a flush configuration with an outer surface (not shown) of the door handle. The touch sensing unit 108 may include suitable logic, circuitry, and/or interfaces that may be configured to detect a human touch on the touch sensing unit 108 and trigger lock or unlock operations associated with the door 104 based on the detection. The touch sensing unit 108 may be operated by electric power from the battery of the vehicle 106. An example of the touch sensing unit 108 may be a capacitive touch sensor.

The in-vehicle communication bus 110 may include a medium through which the various control units, components, and/or systems (for example the sensor system 102) of the vehicle 106 may communicate with each other. In accordance with an embodiment, in-vehicle communication of audio/video data may occur by use of controller area network (CAN) of the in-vehicle communication bus 110 or other suitable network protocols for vehicle communication. The CAN network may be a separate network from the Media Oriented Systems Transport (MOST) multimedia network. The CAN-based network may use a twisted pair cable medium for data transmission. In accordance with an embodiment, the CAN, the MOST-based network, and other in-vehicle communication buses may co-exist in a vehicle, such as the vehicle 106. The in-vehicle communication bus 110 may facilitate access control and/or communication between control circuitry of the sensor system 102 and a set of electronic devices such as ECM or a telematics control unit (TCU) of the vehicle 106.

Various devices or components in the vehicle 106 may connect to the in-vehicle communication bus 110, in accordance with various wired and wireless communication protocols. Examples of the wired and wireless communication protocols for the in-vehicle communication bus 110 may include, but are not limited to, a CAN bus, a vehicle area network (VAN), Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The portable device 112 may include suitable logic, circuitry, and interfaces that may be configured to communicate with the vehicle 106. Specifically, the portable device 112 may communicate with the vehicle 106 to control one or more operations of the vehicle 106. Such operations may include, for example, a lock operation, an unlock operation, a seat adjustment operation, an air conditioning adjustment operation, a lighting control function, an automatic parking operation, and the like. In an embodiment, the portable device 112 may be associated with the user 114 of the vehicle 106. The user 114 may be an owner, a driver, or a passenger of the vehicle 106. Examples of the portable device 112 may include, but are not limited to, a key-fob, a digital-key (stored on a device), a smartphone, a mobile phone, a device that communicates via a Near-Field Communication (NFC), Wi-Fi, or Bluetooth®, a tablet, and/or any electronic device with a wireless communication capability. The wireless communication network 116 may include a medium through which two or more wireless devices may communicate with each other. The wireless communication network 116 may be established in accordance with Institute of Electricals and Electronics Engineers (IEEE) standards for infrastructure mode (Basic Service Set (BSS) configurations), or in some specific cases, in ad hoc mode (Independent Basic Service Set (IBSS) configurations).

In accordance with an embodiment, the wireless communication network 116 may be a Wireless Sensor Network (WSN), a Mobile Wireless Sensor Network (MWSN), a wireless ad hoc network, a Mobile Ad-hoc Network (MANET), a Wireless Mesh Network (WMN), a Wide Area Network (WAN), a Wireless Local Area Network (WLAN), a cellular network, a Long Term Evolution (LTE) network, or an Evolved High Speed Packet Access (HSPA+), and the like. The wireless communication network 116 may operate in accordance with IEEE standards, such as 802 wireless standards or a modified protocol, which may include, but are not limited to, 802.3, 802.15.1, 802.16 (Wireless local loop), 802.20 (Mobile Broadband Wireless Access (MBWA)), 802.11-1997 (legacy version), 802.15.4, 802.11a, 802.11b, 802.11g, 802.11e, 802.11i, 802.11f, 802.11c, 802.11h (specific to European regulations) 802.11n, 802.11j (specific to Japanese regulations), 802.11p, 802.11ac, 802.11ad, 802.11ah, 802.11aj, 802.11ax, 802.11ay, 802.11az, 802.11hr (high data rate), 802.11af (white space spectrum), 802.11-2007, 802.11-2008, 802.11-2012, 802.11-2016.

The wireless communication network 116 may be established to use a type of communication, such as a short-range communication or a long-range communication. The short-range communication may be a point-to-point communication, a point-to-point line-of-sight (LOS) communication, or a point-to-multipoint communication. Examples of protocols for the short-range communication may include, but are not limited to, Radio Frequency Identification (RFID), Wireless USB, Dedicated Short Range Communications (DSRC), and Near Field Communication (NFC) (e.g., NFC Peer-to-Peer), Bluetooth, or Bluetooth Low Energy (BLE). Other examples of protocols may include, but are not limited to, ZigBee, Personal Area Network (PAN), Wi-Max, Wireless Metropolitan Area Networks (WMAN), and Local Multipoint Distribution Service.

In operation, the portable device 112 or a human-machine interface (HMI) inside the vehicle 106 may receive an input to configure an actuation setting of the door 104 of the vehicle 106. The human-machine interface or the portable device 112 may render a user interface (UI) with UI elements to represent door lock/unlock options. At any time-instant, the sensor system 102 may receive a first communication. In accordance with an embodiment, the first communication may be received in response to the input from the portable device 112 or the human-machine interface (e.g., an in-vehicle infotainment system (not shown)) via the in-vehicle communication bus 110.

The first communication may be associated with an actuation setting of the door 104 of the vehicle 106. The actuation setting may include an option to trigger lock or unlock operations of the door 104 based on a movement of the portable device 112 towards or away from the vehicle 106. The option to trigger lock or unlock operations based on the movement may be referred to as an approach lock/unlock option. If the approach lock/unlock option is selected and the movement of the portable device 112 (e.g., a key-fob or a smartphone) is towards the vehicle 106, then the vehicle 106 may unlock the door 104. The vehicle 106 may lock the door 104 if the movement of the portable device 112 (e.g., the key-fob) is away from the vehicle 106 and the approach lock/unlock option is selected.

Based on the first communication, the sensor system 102 may control the touch sensing unit 108 to change a touch response time of the touch sensing unit 108 from a first value to a second value. The touch response time may correspond to a time taken by the sensor system 102 to lock/unlock the door 104 of the vehicle 106 with respect to a time instant at which the user 114 touches the lock or unlock sensors of the touch sensing unit 108. In an embodiment, the change in the touch response time may correspond to an increase in the touch response time from the first value to the second value if the first communication includes a selection of the option in the actuation setting. Alternatively, the change in the touch response time may correspond to a decrease in the touch response time from the first value to the second value if the first communication includes a deselection of the option in the actuation setting. By way of example, and not limitation, if the approach unlock option is selected as part of the actuation setting, then the touch response time may be increased from 1 millisecond to 50 or 100 milliseconds. If the option is unselected or deselected, the touch response time may be decreased from 50 or 100 milliseconds to 1 milliseconds. The change in the touch response time may be caused by a change in amount of electric current that the touch sensing unit 108 is configured to draw from a supply (e.g., a battery unit) of the vehicle 106. Details about the change in the touch response time are provided, for example, in FIGS. 3, and 4.

Figure 2:
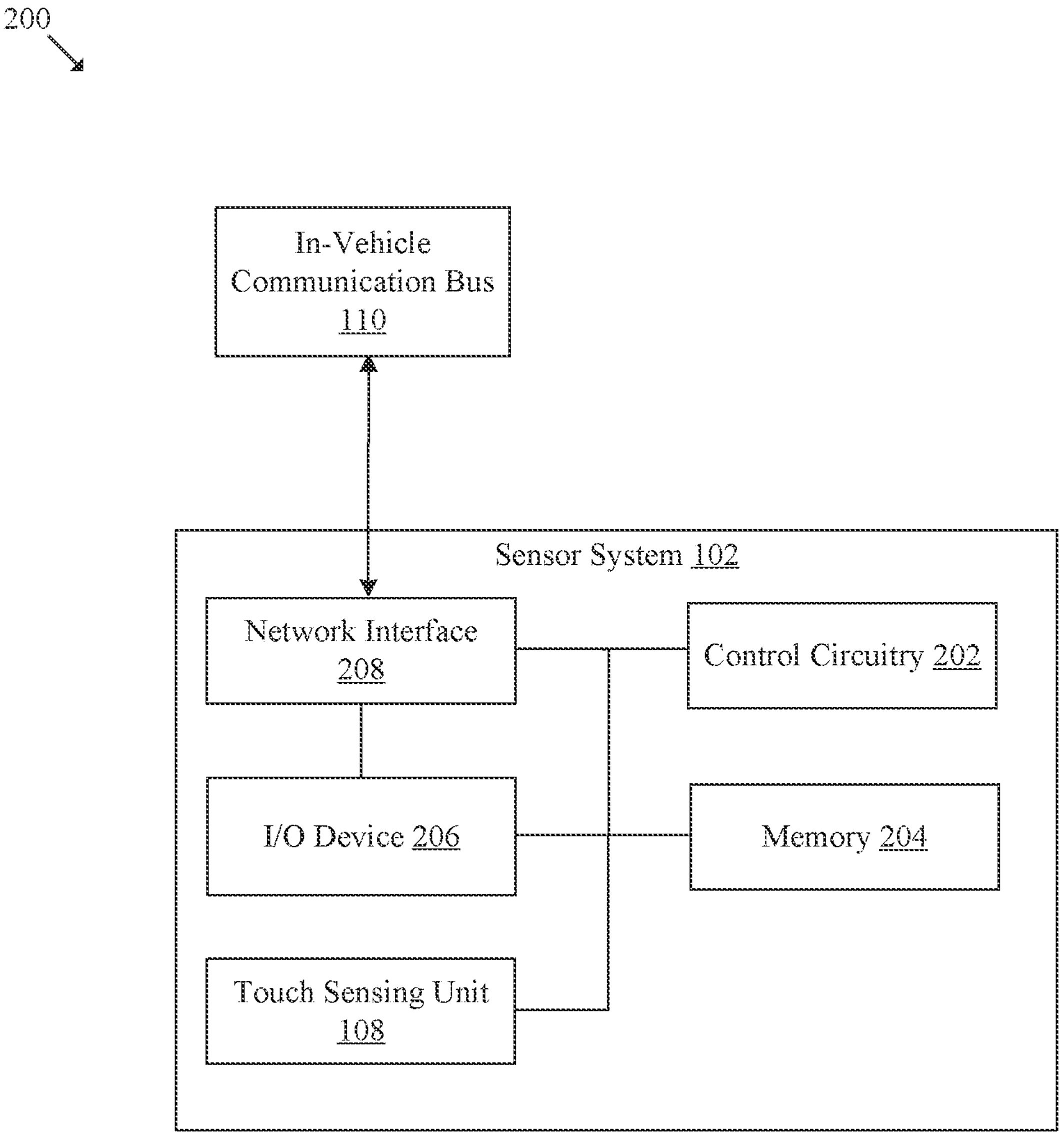
FIG. 2 is a block diagram of an exemplary sensor system for dynamic change in touch response time of door hand touch sensor, in accordance with an embodiment of the disclosure.

FIG. 2 is a block diagram of an exemplary sensor system for dynamic change in touch response time of door hand touch sensor, in accordance with an embodiment of the disclosure. FIG. 2 is explained in conjunction with elements from FIG. 1. With reference to FIG. 2, there is shown a block diagram 200 of the sensor system 102. The sensor system 102 may include control circuitry 202, a memory 204, and a network interface 206. The control circuitry 202 may be communicatively coupled to the memory 204, and the network interface 206 through a wired or wireless connection.

In FIG. 2, the sensor system 102 is shown to include the control circuitry 202, the memory 204, the network interface 206, and the touch sensing unit 108. However, the disclosure may not be so limiting and in some embodiments, the sensor system 102 may include more or less components to perform the same or other functions of the sensor system 102, without a departure from the scope of the disclosure. Details of the other functions or the components have been omitted from the disclosure for the sake of brevity.

The control circuitry 202 may include suitable logic, circuitry, and/or interfaces that may be configured to execute a set of operations of the sensor system 102. The control circuitry 202 may include any suitable special-purpose or general-purpose computer, computing entity, or processing device including various computer hardware or software modules and may be configured to execute instructions stored on any applicable computer-readable storage media. For example, the control circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The control circuitry 202 may include any number of processors configured to, individually or collectively, perform or direct performance of any number of operations of the sensor system 102, as described in the present disclosure. Examples of the control circuitry 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store a set of instructions executable by the control circuitry 202. The memory 204 may be configured to store the first communication and values of the touch response time for the touch sensing unit 108. Examples of implementation of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The network interface 206 may include suitable logic, circuitry, and interfaces that may be configured to facilitate communication between the control circuitry 202, the portable device 112, and a set of electronic devices (e.g., in-vehicle ECUs, lighting system, or infotainment system) via the in-vehicle communication bus 110. The network interface 206 may be implemented by use of various known technologies to support wired or wireless communication of the sensor system 102 with the in-vehicle communication bus 110 and the wireless communication network 116. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

Figure 3:
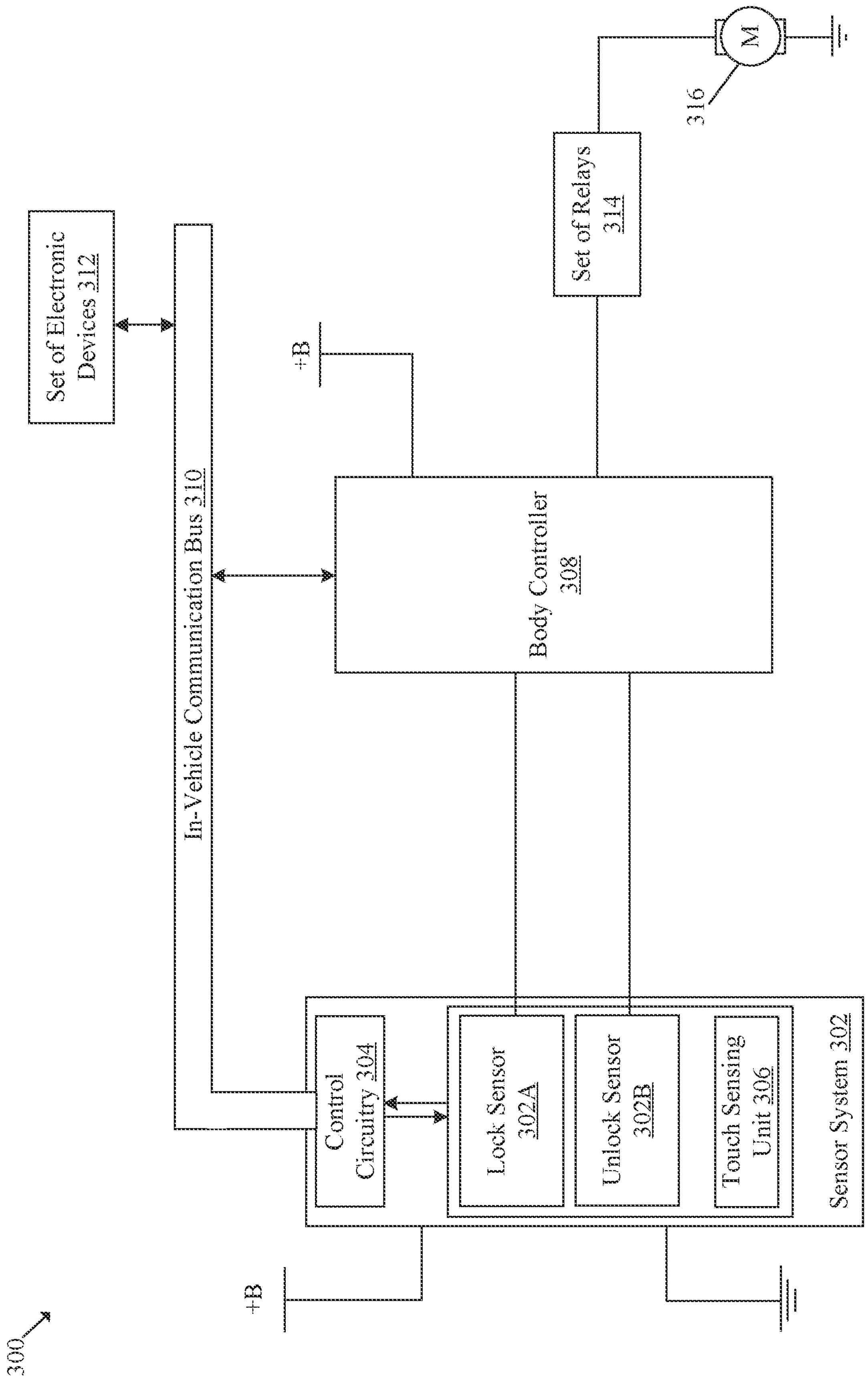
FIG. 3 is a diagram that illustrates a system configuration of a sensor system for controlling a dynamic change in touch response time of a touch sensing unit, in accordance with an embodiment of the disclosure.

FIG. 3 is a diagram that illustrates a system configuration of a sensor system for controlling a dynamic change in touch response time of a touch sensing unit, in accordance with an embodiment of the disclosure. FIG. 3 is explained in conjunction with elements from FIG. 1 and FIG. 2. With reference to FIG. 3, there is shown an exemplary diagram 300. Within the diagram 300, there is shown a sensor system 302 that includes control circuitry 304 and a touch sensing unit 306. There is further shown a body controller 308, an in-vehicle communication bus 310, a set of electronic devices 312, a set of relays 314, and a mechanical latch 316. The sensor system 302, the control circuitry 304, the touch sensing unit 306, and the in-vehicle communication bus 310 may be exemplary implementations of the sensor system 102, the control circuitry 202, the touch sensing unit 108, and the in-vehicle communication bus 110 of FIG. 1 or FIG. 2.

In accordance with an embodiment, the touch sensing unit 306 may include sensors, such as a lock sensor 302A and an unlock sensor 302B. The sensors may be responsible for triggering the lock and unlock operations for a door unit (e.g., the door 104) of the vehicle 106. The sensor system 302 may periodically power the touch sensing unit 306 to control the locking and unlocking operations of the vehicle 106. In an embodiment, the sensor system 302 may be integrated into a door handle of the door 104 of the vehicle 106. Specifically, the touch sensing unit 306 may be disposed the door handle such that a touch surface of the touch sensing unit 306 is in a flush configuration with an outer surface of the door handle.

The lock sensor 302A may be a capacitive touch unit that includes suitable logic, circuitry, and interface to receive a touch input from the user 114 and one or more inputs via the in-vehicle communication bus 310. Based on the touch input or the one or more inputs, the lock sensor 302A may send a signal to the body controller 308 to initiate the lock operations of the door 104. Similar to the lock sensor 302A, the unlock sensor 302B may be a capacitive touch unit that includes suitable logic, circuitry, and interface to receive a touch input from the user 114 and one or more inputs via the in-vehicle communication bus 310. Based on the touch input or the one or more inputs, the unlock sensor 302B may send a signal to the body controller 308 to initiate the unlock operations of the door 104.

In accordance with an embodiment, the touch sensing unit 306 may include a touch sensor that incorporates the functionality of both the lock sensor 302A as well as the unlock sensor 302B. In such an implementation, the touch sensor may transmit signals to the body controller 308 to lock or unlock the vehicle 106 based on a frequency of touch detected by the touch sensing unit 306. For example, if a single touch is detected, then the touch sensor may transmit a first signal to the body controller 308 to unlock the door 104 of the vehicle 106. Similarly, if a double touch (or double tap) is detected, the touch sensor may transmit a second signal to the body controller 308 to lock the door 104 of the vehicle 106.

The body controller 308 may include suitable logic, circuitry, interfaces, and/or code that may be configured to control lock and unlock operations of the vehicle 106 based on the signals received by the lock sensor 302A and/or the unlock sensor 302B of the sensor system 302. The body controller 308 may be a specialized electronic circuitry (e.g., an electronic control unit (ECU)) to control different functions, such as, but not limited to, engine operations, communication operations, or data acquisition of the vehicle 106. In an embodiment, the body controller may control different operations via the in-vehicle communication bus 310.

The in-vehicle communication bus 310 may include a medium through which the various control units, components, and/or systems of the vehicle 106 may communicate with each other. In an embodiment, the in-vehicle communication bus 310 may be a Controller Area Network (CAN) bus that connects the control circuitry 304 to the set of electronic devices 312 of the vehicle 106.

Each of the set of electronic devices 312 may correspond to a component of the vehicle 106 that may perform operations related to, for example, a security of the vehicle 106, a control of lighting or Heating, Ventilation, and Air Conditioning (HVAC), a rendering of infotainment or information associated with the vehicle 106, and the like. Example of the set of electronic devices 312 may include, but is not limited to, an infotainment system, a lighting system, an HVAC system, or a security device.

Each of the set of relays 314 may correspond to a switch that may open and close electromechanically or electrically based on control signals. Each of the set of relays 314 may control a flow of electric current to a component connected to the relay and may include an electromagnet, an armature, a spring, and a set of electrical contacts. In an embodiment, at least one relay of the set of relays 314 may be used to supply electric power to the mechanical latch 316 to lock or unlock the door 104 of the vehicle 106. Examples of a relay may include, but are not limited to, a general-purpose relay, a machine control relay, a reed relay, a zero-switching relay, an instant ON relay, a peak switching relay, and an analog switching relay.

The mechanical latch 316 may be a mechanical fastener that may detachably latch the door 104 of the vehicle 106 with a support member of the vehicle 106. The mechanical latch 316 may be electronically controlled by electric power supplied via the set of relays 314. Examples of the mechanical latch may include, but are not limited to, a deadbolt latch, a spring latch, a slam latch, a cam latch, a Norfolk latch, and a Suffolk latch.

During operation, the sensor system 302 may receive a first communication associated with an actuation setting of the door 104 of the vehicle 106. The actuation setting of the door 104 may correspond to an action that may cause the door 104 to lock or unlock. The actuation setting may be received via the in-vehicle communication bus 310 (e.g., CAN bus) and may include an option to trigger lock or unlock operations of the door 104 based on a movement of the portable device 112 towards or away from the vehicle 106. The lock operations, when triggered, may activate a relay of the set of relays 314, causing the mechanical latch 316 to engage and the door 104 to lock. Similarly, the unlock operations, when triggered, may activate another relay of the set of relays 314, causing the mechanical latch 316 to release or disengage and the door 104 to unlock.

In an embodiment, the option to trigger lock or unlock operations of the door 104 may correspond to an "approach unlock" option. In the approach unlock operation, if the portable device 112 is within a pre-defined range of the vehicle 106 and/or is detected to approach the vehicle 106, then the vehicle 106 may unlock the door 104. Similarly, if portable device 112 is outside the pre-defined range of the vehicle 106 and/or is detected to be moving away from the vehicle 106, then the vehicle 106 may lock the door 104.

Based on the first communication, the sensor system 302 may control the touch sensing unit 306 to change a touch response time of the touch sensing unit 306 from a first value to a second value. If the first communication includes a selection of the option in the actuation setting, then the change in the touch response time may correspond to an increase in the touch response time. Alternatively, the change in the touch response time corresponds to a decrease in the touch response time if the first communication includes a deselection of the option in the actuation setting. By way of example, and not limitation, if the approach unlock option is selected as part of the actuation setting, then the touch response time may be increased from 1 millisecond to 50 or 100 milliseconds. If the option is unselected or deselected, the touch response time may be decreased from 50 or 100 milliseconds to 1 milliseconds.

In an embodiment, the control circuitry 304 may control a supply of electric power to the touch sensing unit 306 based on the first communication. The control in the supply of electric power may cause the change in the touch response time of the touch sensing unit 306. For instance, if the first communication includes a selection of the option in the actuation setting, then the supply of electric power may be controlled to decrease an electric current drawn by the touch sensing unit 306 from a first current value (for example, 1 milliampere) to a second current value (e.g., 500 microamperes). Alternatively, the supply of electric power may be controlled to increase the electric current drawn by the touch sensing unit 306 from a first current value (e.g., 500 microamperes) to a second current value (1 milliampere), if the first communication includes a deselection of the option in the actuation setting. In some instances, the electric current may be referred to as a Q-current or a Quiescent current. A threshold Q-current (e.g., 750 microamperes) may be used to ensure that the decrease in the electric current is always below the threshold or the increase is always above the threshold.

In order to lock or unlock the door 104 of the vehicle 106, the control circuitry 304 may transmit a signal to the body controller 308. Based on the reception of the signal, the body controller 308 may trigger at least one of the set of relays 314 to actuate the mechanical latch 316. The mechanical latch 316 may be actuated through an actuator coupled to the mechanical latch 316 to lock or unlock the door 104 of the vehicle 106. The actuation may be performed based on a supply of electric power to the actuator from a battery unit (e.g., a battery pack) of the vehicle 106. The power may be supplied via at least one of the set of relays 314.

In an embodiment, the control circuitry 304 may receive a second communication via the in-vehicle communication bus 310. In an embodiment, the second communication may be generated in response to an input from the user 114 via the portable device 112. For example, the user 114 may press a button on the portable device 112 to generate and transmit the second communication to the vehicle 106.

The second communication may include information from the portable device 112 to be used to trigger the lock or unlock operations of the door 104 of the vehicle 106. The information may include, for example, a message that indicates a presence of the portable device 112 (e.g., a Digi key or a smartphone) in a communication range or a proximity of the vehicle 106. In some instances, the information may also include a token and/or a secret key that may be used to authenticate the user 114 as a valid user of the vehicle 106.

Based on the second information, the control circuitry 304 may change the touch response time of the touch sensing unit 306. If the portable device 112 is used directly (or in combination with the actuation setting) to trigger the lock or unlock operations of the door 104 and the user 114 is not required to touch the touch sensing unit 306 on the door handle, then the control circuitry 304 may increase the touch response time of the touch sensing unit 306 from a first value (e.g., 1 millisecond) to a value (e.g., 100 milliseconds) that may be above a threshold (e.g., 50 milliseconds).

Figure 4:
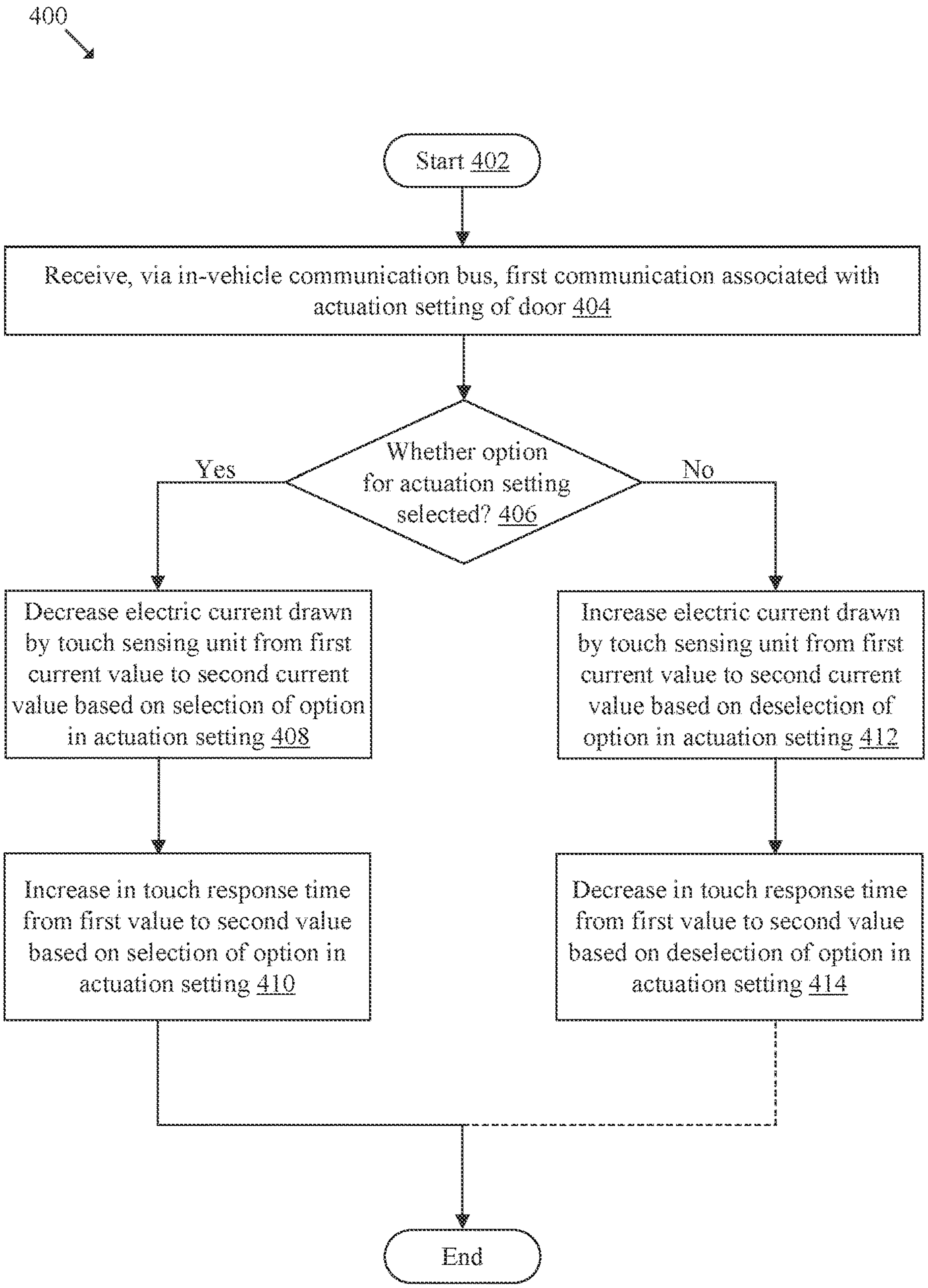
FIG. 4 is a flowchart that illustrates exemplary operations for dynamic change in a touch response time of a door hand touch sensor, in accordance with an embodiment of the disclosure.

FIG. 4 is a flowchart that illustrates exemplary operations for dynamic change in a touch response time of a door hand touch sensor, in accordance with an embodiment of the disclosure. With reference to FIG. 4, there is shown a flowchart 400. The flowchart 400 is described in conjunction with FIGS. 1, 2, and 3. The operations from 402 to 416 may be implemented, for example, by the sensor system 102 of FIG. 1 or the control circuitry 202 of FIG. 2. The operations of the flowchart 400 may start at 402 and proceed to 404.

At 404, a first communication associated with the actuation setting of the door 104 may be received via the in-vehicle communication bus 110. In accordance with an embodiment, the sensor system 102 may receive the first communication associated with the actuation setting of the door 104. The actuation setting may include an option to trigger lock or unlock operations of the door 104 based on the movement of the portable device 112 towards or away from the vehicle 106. Details about the reception of the first communication are provided, for example, in FIGS. 1 and 3.

At 406, it may be determined whether the option to trigger lock or unlock operations of the door 104 based on the movement of the portable device 112 towards or away from the vehicle 106 is selected or not. In case the option is selected, then the control may be transferred to 408. Otherwise, the control may be transferred to 412.

At 408, the control circuitry 202 may control a supply of electric power to the touch sensing unit 108 based on the first communication. The control of the supply of electric power may correspond to control of electric current drawn by the touch sensing unit 108. In an embodiment, the electric current drawn by the touch sensing unit 108 may decrease from the first current value to the second current value, based on a determination that the first communication includes a selection of the option in the actuation setting.

At 410, the control circuitry 202 may control the touch sensing unit 108 to change a touch response time of the touch sensing unit 108. The change may be performed based on the first communication. Specifically, the change in the touch response time may be caused by a decrease in the current drawn by the touch sensing unit 108 from the first current value to the second current value. If the option (i.e., to trigger lock or unlock operations of the door 104 based on a movement of the portable device 112 towards or away from the vehicle 106) is selected, then the control circuitry 202 may increase the touch response time from the first value (say 1 millisecond) to the second value (50 or 100 milliseconds).

At 412, the control circuitry 202 may control a supply of electric power to the touch sensing unit 108 based on the first communication. The control of the supply of electric current may correspond to controlling the electric current that may be drawn by the touch sensing unit 108. The electric current may be drawn from the battery of the vehicle 106, for example.

In an embodiment, the control circuitry 202 may be configured to increase the electric current that may be drawn by the touch sensing unit 108 from the first current value to the second current value. The electric current drawn by the touch sensing unit 108 may be increased from the first current value to the second current value based on the determination that the first communication includes a deselection of the option in the actuation setting.

At 414, the control circuitry 202 may control the touch sensing unit 108 to change the touch response time of the touch sensing unit 108. In an embodiment, the change in the touch response time may correspond to a decrease in the touch response time from the first value to the second value. The decrease in the touch response time may be caused by an increase in the current drawn by the touch sensing unit 108 from the first current value to the second current value. Control may pass to end.

Although the flowchart 400 is illustrated as discrete operations, such as 404, 406, 408, 410, 412, and 414, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (such as the sensor system 102) for dynamic change in touch response time of door hand touch sensor. The set of instructions may be executable by the machine and/or the computer to perform operations that may include reception of a first communication associated with an actuation setting of the door (such as the door 104) via the in-vehicle communication bus (such as the in-vehicle communication bus 110). The actuation setting may include an option to trigger lock or unlock operations of the door based on a movement of a portable device (such as the portable device 112) towards or away from the vehicle (such as the vehicle 106). The operations may further include controlling the touch sensing unit (such as the touch sensing unit 108) to change a touch response time of the touch sensing unit from a first value to a second value. The change may be performed based on the first communication.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. A sensor system for a door of a vehicle, comprising:

a touch sensing unit; and control circuitry communicatively coupled to the touch sensing unit and an in-vehicle communication bus, wherein the control circuitry:

receives, via the in-vehicle communication bus, a first communication associated with an actuation setting of the door, wherein the actuation setting includes an option to trigger lock or unlock operations of the door based on a movement of a portable device towards or away from the vehicle; and controls the touch sensing unit to change a touch response time of the touch sensing unit from a first value to a second value, wherein the change is performed based on the first communication.

2. The sensor system according to claim 1, wherein the touch sensing unit is disposed in a door handle of the door such that a touch surface of the touch sensing unit is in a flush configuration with an outer surface of the door handle.

3. The sensor system according to claim 1, wherein the in-vehicle communication bus is a Controller Area Network (CAN) bus that connects the control circuitry to a set of electronic devices in the vehicle.

4. The sensor system according to claim 1, wherein the change in the touch response time corresponds to an increase in the touch response time from the first value to the second value if the first communication includes a selection of the option in the actuation setting.

5. The sensor system according to claim 1, wherein the change in the touch response time corresponds to a decrease in the touch response time from the first value to the second value if the first communication includes a deselection of the option in the actuation setting.

6. The sensor system according to claim 1, wherein the control circuitry further controls a supply of electric power to the touch sensing unit based on the first communication, and the control of the supply of electric power causes the change in the touch response time of the touch sensing unit.

7. The sensor system according to claim 6, wherein the supply of electric power is controlled to decrease an electric current drawn by the touch sensing unit from a first current value to a second current value, if the first communication includes a selection of the option in the actuation setting.

8. The sensor system according to claim 6, wherein the supply of electric power is controlled to increase an electric current drawn by the touch sensing unit from a first current value to a second current value, if the first communication includes a deselection of the option in the actuation setting.

9. The sensor system according to claim 1, wherein the control circuitry further receives a second communication via the in-vehicle communication bus, and wherein the second communication includes information from the portable device to be used to trigger the lock or unlock operations of the door.

10. The sensor system according to claim 9, wherein the change in the touch response time is performed further based on the second communication.

11. A method, comprising:

in a sensor system for a door of a vehicle:

receiving, via an in-vehicle communication bus, a first communication associated with an actuation setting of the door, wherein the actuation setting includes an option to trigger lock or unlock operations of the door based on a movement of a portable device towards or away from the vehicle; and controlling a touch sensing unit of the sensor system to change a touch response time of the touch sensing unit from a first value to a second value, wherein the change is performed based on the first communication.

12. The method according to claim 11, wherein the touch sensing unit is disposed in a door handle of the door such that a touch surface of the touch sensing unit is in a flush configuration with an outer surface of the door handle.

13. The method according to claim 11, wherein the in-vehicle communication bus is a Controller Area Network (CAN) bus that connects a control circuitry of the sensor system to a set of electronic devices in the vehicle.

14. The method according to claim 11, wherein the change in the touch response time corresponds to an increase in the touch response time from the first value to the second value if the first communication includes a selection of the option in the actuation setting.

15. The method according to claim 11, wherein the change in the touch response time corresponds to a decrease in the touch response time from the first value to the second value if the first communication includes a deselection of the option in the actuation setting.

16. The method according to claim 11, further comprising controlling a supply of electric power to the touch sensing unit based on the first communication, wherein the control of the supply of electric power causes the change in the touch response time of the touch sensing unit.

17. The method according to claim 16, wherein the supply of electric power is controlled to decrease an electric current drawn by the touch sensing unit from a first current value to a second current value, if the first communication includes a selection of the option in the actuation setting.

18. The method according to claim 16, wherein the supply of electric power is controlled to increase an electric current drawn by the touch sensing unit from a first current value to a second current value, if the first communication includes a deselection of the option in the actuation setting.

19. The method according to claim 11, further comprising receiving a second communication via the in-vehicle communication bus, wherein the second communication includes information from the portable device to be used to trigger the lock or unlock operations of the door.

20. A non-transitory computer-readable medium having stored thereon computer implemented instructions that, when executed by a sensor system, causes the sensor system to execute operations, the operations comprising:

receiving, via an in-vehicle communication bus, a first communication associated with an actuation setting of a door of a vehicle, wherein the actuation setting includes an option to trigger lock or unlock operations of the door based on a movement of a portable device towards or away from the vehicle; and controlling a touch sensing unit of the sensor system to change a touch response time of the touch sensing unit from a first value to a second value, wherein the change is performed based on the first communication.

* * * * *